United States Patent
Shiba et al.

(10) Patent No.: US 9,061,390 B2
(45) Date of Patent: Jun. 23, 2015

(54) PRODUCTION LINE SYSTEM

(75) Inventors: Shigemitsu Shiba, Nagoya (JP); Yoshiro Shiba, Nagoya (JP); Takayuki Miura, Anjo (JP); Manabu Kayamoto, Anjo (JP); Ichirou Sakuraba, Nagoya (JP); Hiroshi Nakayama, Nagoya (JP)

(73) Assignees: Zeneral Heatpump Industry Co., Ltd., Nagoya-Shi (JP); Aisin AW Co., Ltd., Anjo-Shi (JP)

( * ) Notice: Subject to any disclaimer, the term of this patent is extended or adjusted under 35 U.S.C. 154(b) by 729 days.

(21) Appl. No.: 13/032,004

(22) Filed: Feb. 22, 2011

(65) Prior Publication Data

US 2011/0203618 A1 Aug. 25, 2011

(30) Foreign Application Priority Data

Feb. 24, 2010 (JP) ................. 2010-039003

(51) Int. Cl.
*B23Q 11/12* (2006.01)
(52) U.S. Cl.
CPC ..................... *B23Q 11/12* (2013.01)
(58) Field of Classification Search
None
See application file for complete search history.

(56) References Cited

U.S. PATENT DOCUMENTS

2002/0002841 A1 1/2002 Izawa et al.
2004/0237466 A1* 12/2004 Grossmann et al. ............ 53/167

FOREIGN PATENT DOCUMENTS

| CN | 87108124 | 6/1988 |
|---|---|---|
| CN | 1332347 | 1/2002 |
| CN | 1403763 | 3/2003 |
| CN | 1563830 A | 1/2005 |
| EP | 1 170 560 | 1/2002 |
| JP | 61-259062 | 11/1986 |
| JP | 11-130195 | 5/1999 |
| JP | 3810036 B2 | 8/2006 |
| JP | 2008-030169 | 2/2008 |
| JP | 2008-093578 | 4/2008 |

OTHER PUBLICATIONS

Japanese Office Action, dated Oct. 21, 2013 (3 pages).
Chinese Office Action from a corresponding Chinese patent application bearing a mailing date of Feb. 8, 2014, 6 pages.
Chinese Office Action (Application No. 201110044711.5) dated Mar. 31, 2015.

* cited by examiner

*Primary Examiner* — Jason Ko
(74) *Attorney, Agent, or Firm* — Burr & Brown, PLLC

(57) ABSTRACT

A production line system includes a cooling processing step of cooling a coolant for processing machines (lathes) of work, and a heating processing step of heating washing fluid for a washing machine which washes the work after processing by the lathes. The heating processing step and the cooling processing step are performed by a heat pump in one heat pump cycle. Further, a heat balance between heating in the heating processing step and cooling in the cooling processing step is adjusted with the setting temperature of the washing fluid and the setting temperature of the coolant.

10 Claims, 8 Drawing Sheets

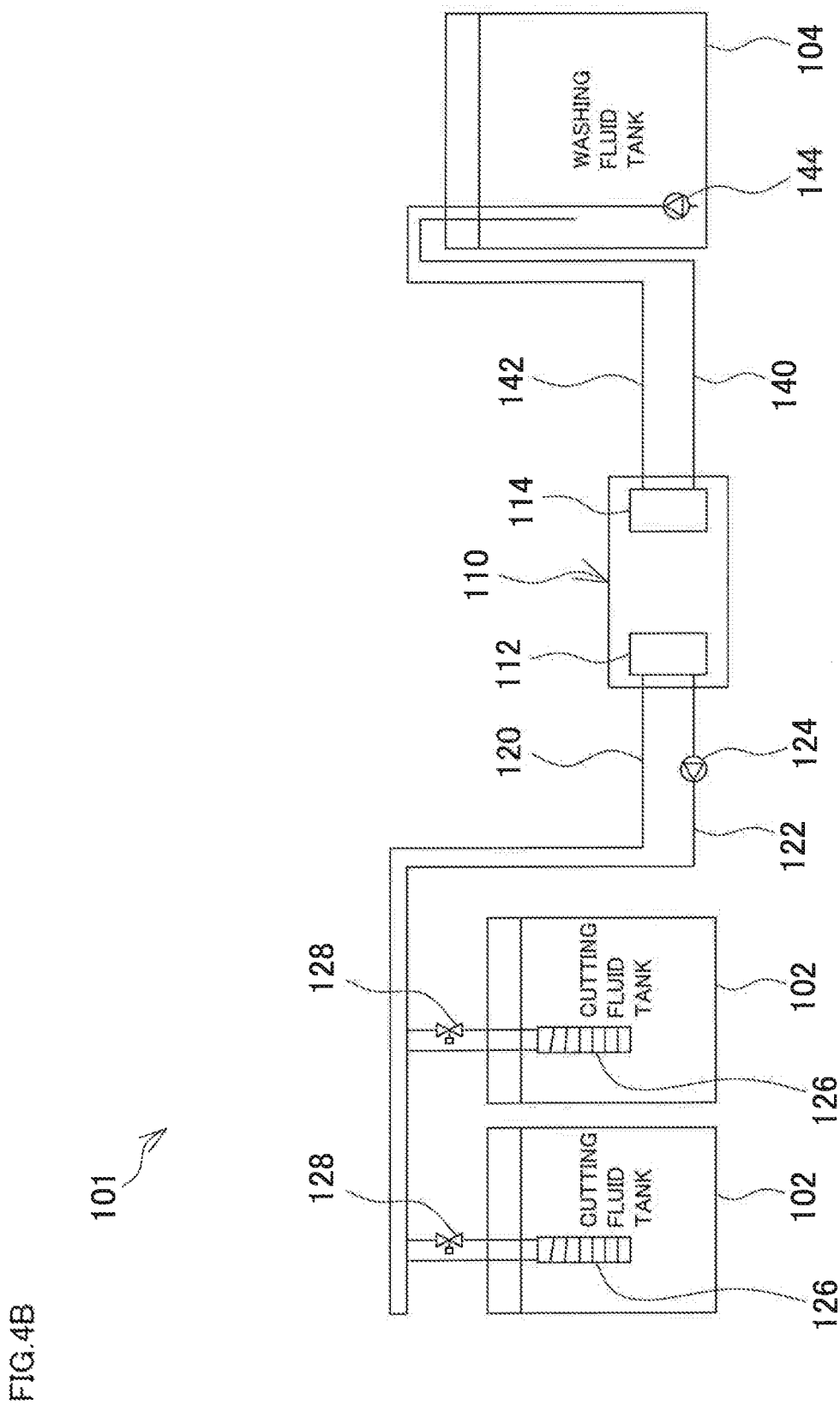

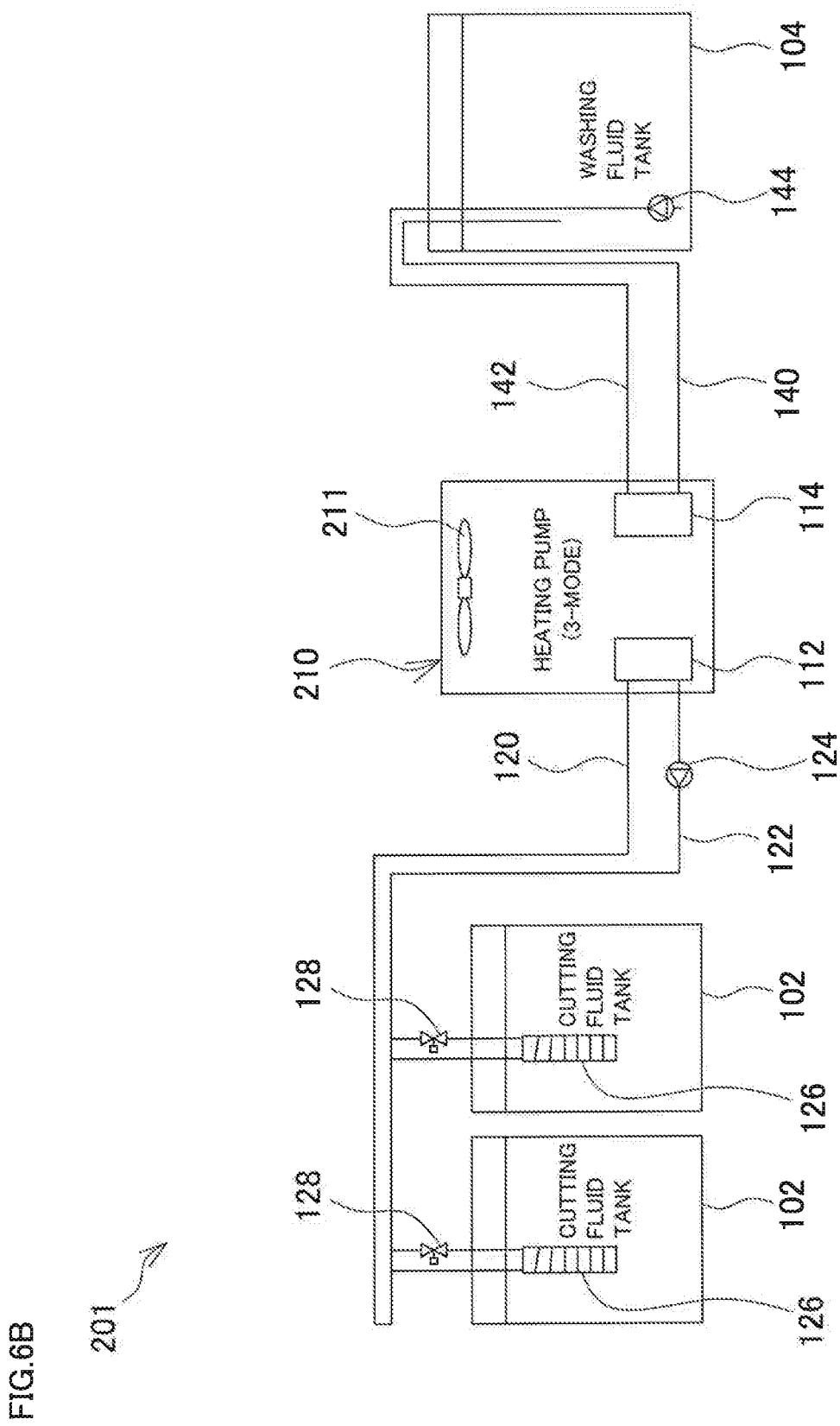

PRODUCTION LINE SYSTEM

This application claims the entire benefit of Japanese Patent Application Number 2010-039003 filed on Feb. 24, 2010, the entirety of which is incorporated by reference.

BACKGROUND OF THE INVENTION

1. Field of the Invention

The present invention relates to a production line system using a heat pump.

2. Description of the Related Art

A production line system for a carbonated beverage manufacturing plant has been known as a conventional production line system (Japanese Patent No. 3810036). The system has a cooling step of cooling raw water for a beverage with cooling brine and a heating step of heating a product after filling the beverage into a container to the dew point using high-temperature water. In the heating step, high-temperature water is produced using condensation heat on the condenser side in a heating unit which has a heat pump cycle driven by exhaust heat from the plant as a heating source. Further, in the cooling step, the product is cooled with the cooling brine using evaporative cooled heat on the evaporator side in a cooling unit which has a heat pump cycle driven by exhaust heat from the heating step as a heating source.

In such a production line system for a carbonated beverage manufacturing plant, there are a plurality of heat pump cycles, and a distance from the heating step and the cooling step to the heat pump cycles is long in general because the cooling step, the heating step, and heat discharge from the plant are performed via a carbonation step and a bottling step. Accordingly, a large amount of energy is wasted, and it is necessary to install the heat pump cycles (heating/cooling systems) in the entire large-scale plant, resulting in poor flexibility in size.

An object of a first aspect of the present invention is to provide a production line system of processing machines which is high in energy efficiency and flexibility.

SUMMARY OF THE INVENTION

In order to achieve the above-described object, a first aspect of the present invention provides a production line system including: a cooling processing step of cooling a coolant for processing machines of work; and a heating processing step of heating a washing fluid used for washing the work before or after processing by the processing machines, wherein the heating processing step and the cooling processing step are performed in one heat pump cycle.

In order to enable a long-time continuous cooling/heating simultaneous operation and to further improve the energy efficiency, a second aspect of the present invention provides, in addition to the above-described objects, the production line system wherein in any one of the heating processing step and the cooling processing step, the setting temperature is changed in accordance with the ambient temperature, so that a heat balance between heating in the heating processing step and cooling in the cooling processing step is adjusted.

In order to reduce the possibility of failures of the system and to easily install the system, a third aspect of the present invention provides, in addition to the above-described objects, the production line system, wherein the coolant is cooled by using a coolant refrigerant, and the coolant refrigerant is cooled in the heat pump cycle.

In order to improve the energy efficiency and processing accuracy, a fourth aspect of the present invention provides, in addition to the above-described objects, the production line system wherein plural processing machines are installed, and a coolant temperature controlling unit for controlling the temperature of the coolant is arranged at each processing machine.

In order to enable a longer continuous cooling/heating simultaneous operation and to considerably reduce the energy, a fifth or sixth aspect of the present invention provides, in addition to the above-described objects, the production line system wherein the heat balance between heating in the heating processing step and cooling in the cooling processing step is adjusted with the setting temperature of the washing fluid or the setting temperature of the coolant.

According to an aspect of the present invention, a production line system of processing machines which is high in energy efficiency and flexibility can be advantageously provided because a heating processing step and a cooling processing step are connected in one heat pump cycle. In addition, because a heat pump is used in a set of processing lines, cooling and heating are always necessary at the same time during production. Accordingly, a cooling/heating simultaneous operation can be performed for a long time, and a production line with high energy efficiency can be realized.

BRIEF DESCRIPTION OF THE DRAWINGS

FIG. 4B is a diagram explaining a production line system, in which cooling chillers, chiller heat exchangers, a heater and a heater heat exchanger are omitted, according to a second embodiment of the present invention;

FIG. 6B is a diagram explaining a production line system, in which cooling chillers, chiller heat exchangers, a heater and a heater heat exchanger are omitted, according to a second embodiment of the present invention.

DETAILED DESCRIPTION OF THE INVENTION

Figure 1:
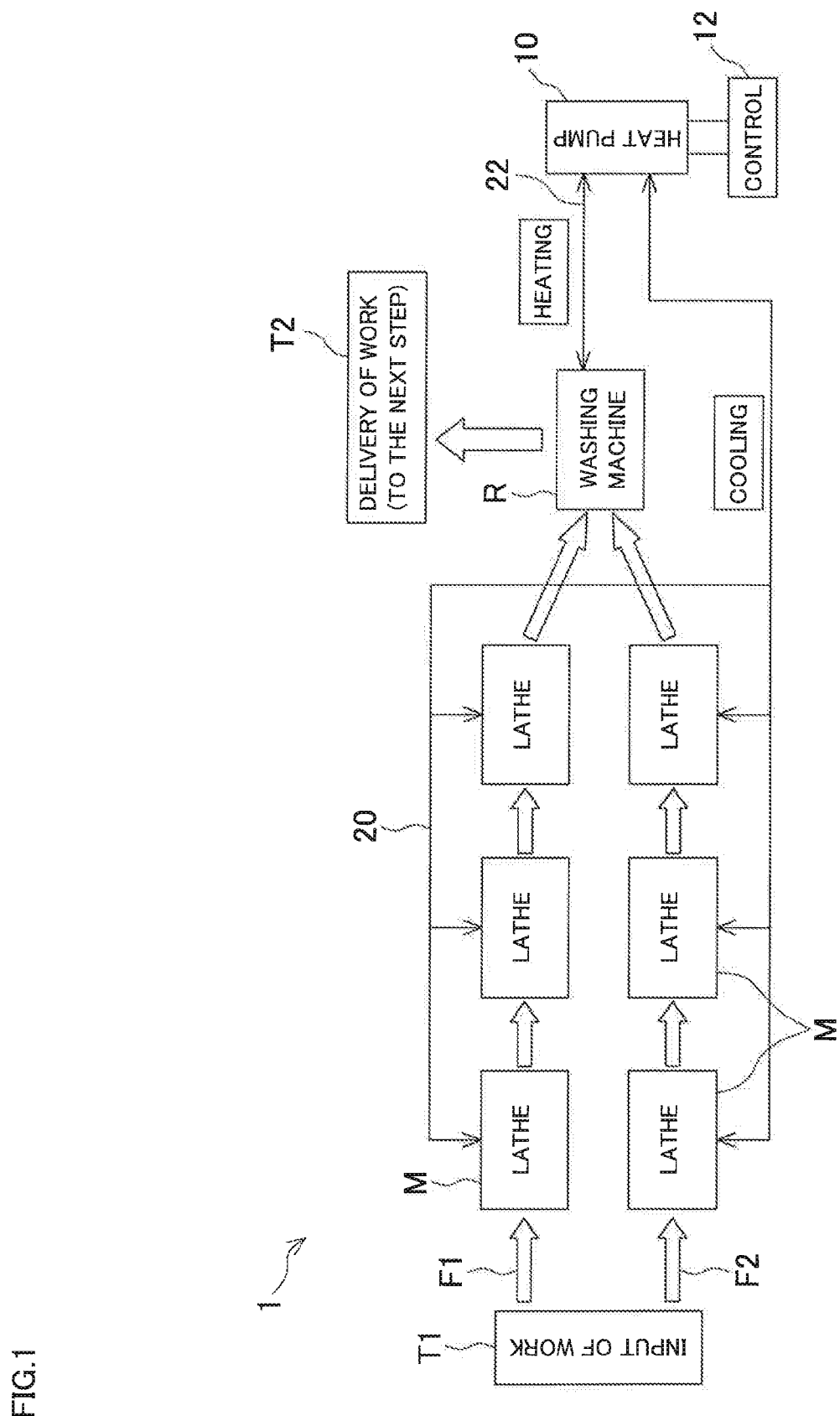
FIG. 1 is an explanation diagram of a production line system according to a first embodiment of the present invention.

Hereinafter, embodiments according to the present invention will be described while occasionally referring to the drawings. It should be noted that the present invention is not limited to the following embodiments.

First Embodiment

<Configurations>

FIG. 1 is an explanation diagram of a production line system 1 of a first embodiment according to the present invention. The production line system 1 has two lines F1 and F2 in FIG. 1, and plural lathes M as processing machines are arranged on the lines F1 and F2. A work input unit T1 is disposed at the starting points of the lines F1 and F2, and the work input unit T1 is common to both the lines F1 and F2. A washing machine R for work either from the line F1 or the line F2 and a work delivery unit T2 for the next processing step are arranged at the ending points of the lines F1 and F2.

The production line system 1 includes a heat pump 10 and a controlling unit 12. A cooling-side pipe 20 which allows a coolant (cutting fluid) to flow back and forth is provided between the heat pump 10 and the lathes M, and a heating-side pipe 22 which allows a washing fluid to flow back and forth is provided between the heat pump 10 and the washing machine R.

The heat pump 10 includes an evaporator and a condenser (not shown) as elements of a heat pump cycle. The heat pump 10 cools the coolant introduced from the cooling-side pipe 20 by heat exchange with the evaporator (cooling processing step), and heats the washing fluid introduced from the heating-side pipe 22 by heat exchange with the condenser (heating processing step). Specifically, the cooling processing step and the heating processing step are connected in one heat pump cycle.

On the other hand, the controlling unit 12 is coupled to an evaporator-side calorimeter (not shown) which detects the amount of heat Pc (kilowatt, kW) per unit time added to a refrigerant of the heat pump when cooling the coolant, and is couple to a condenser-side calorimeter (not shown) which detects the amount of heat Pc (kW) per unit time taken from the refrigerant of the heat pump when heating the washing fluid. It should be noted that calorimeters include those which obtain the amount of heat on the basis of the temperature of the refrigerant detected by a refrigerant temperature sensor or an operation using a refrigerant flowmeter. Further, the controlling unit 12 is coupled to a coolant temperature sensor (not shown) which detects a coolant temperature Tc, and a washing fluid temperature sensor (not shown) which detects a washing fluid temperature Ts.

Further, the controlling unit 12 is electrically coupled to the heat pump 10, and controls the heat pump 10 to perform operations as described below.

<Operations>

Figure 2:
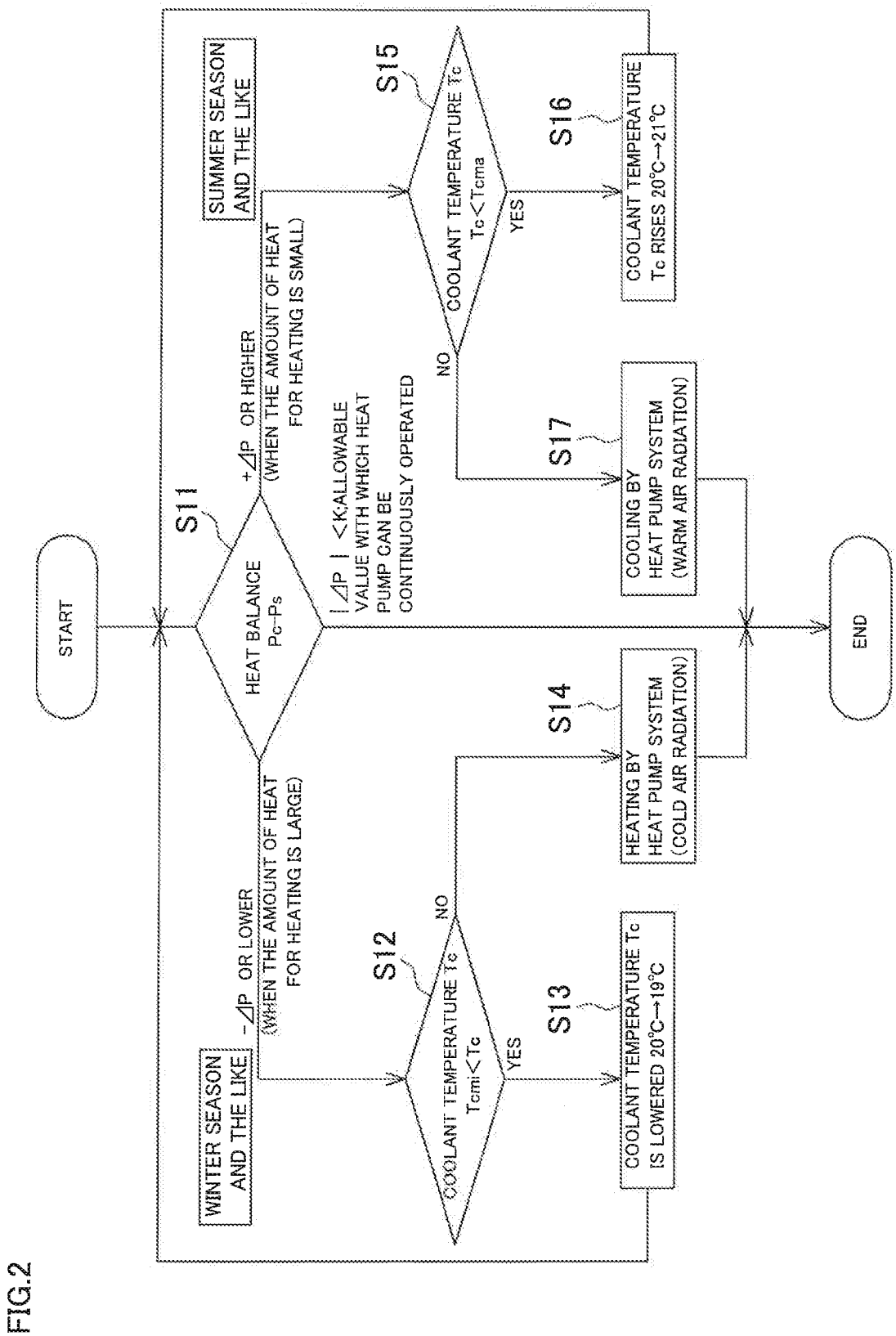
FIG. 2 is a flowchart of the production line system of FIG. 1 for showing operations in the case where the setting range of the temperatures of a coolant fluid is wide.
Figure 3:
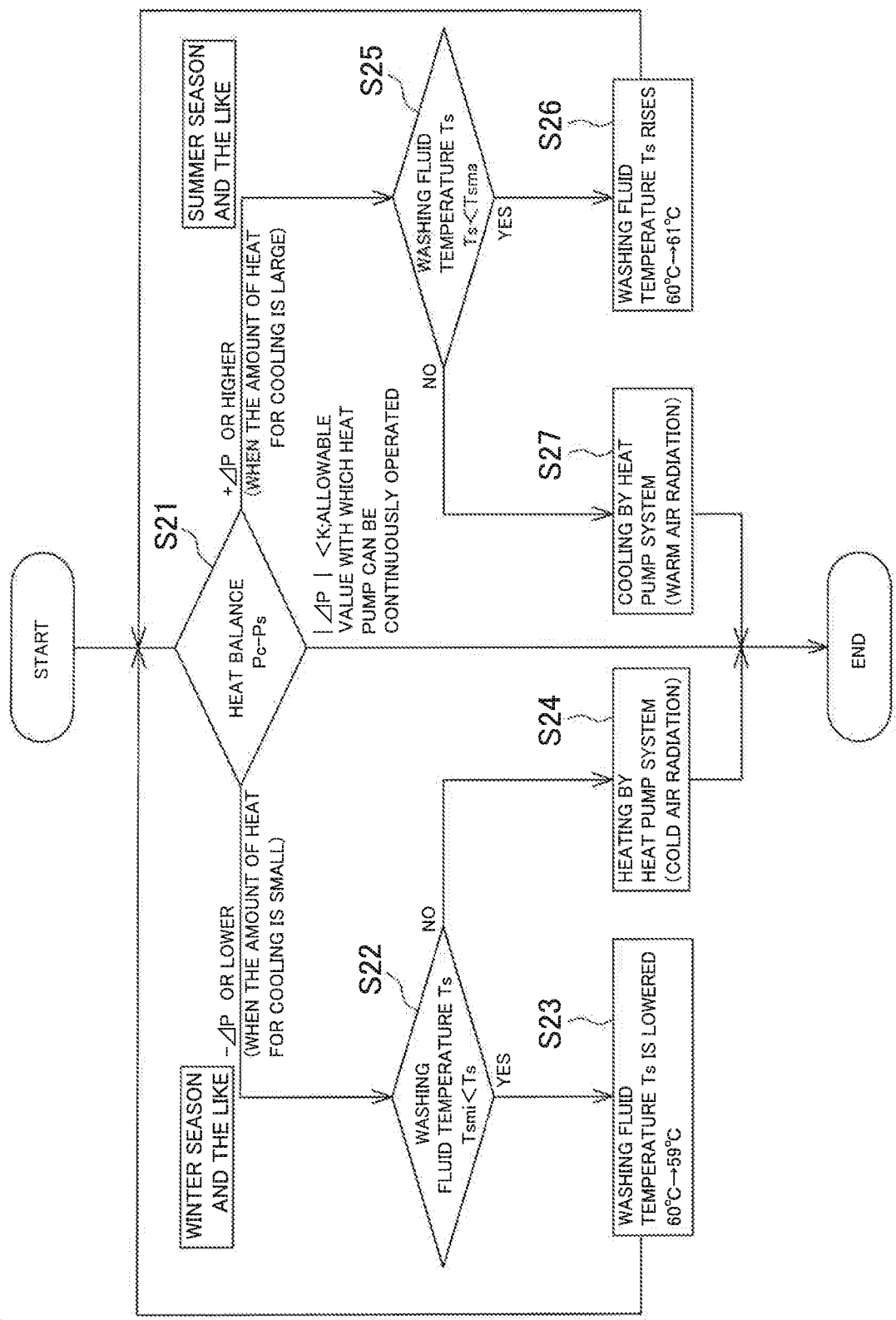
FIG. 3 is a flowchart of the production line system of FIG. 1 for showing operations in the case where the setting range of the temperatures of the coolant fluid is narrow.

FIG. 2 is a flowchart of operations of a production line system 1 in the case where the range of temperatures required for the coolant is wide and the setting range of coolant temperatures is wide as in the case of rough processing. FIG. 3 is a flowchart of operations of the production line system 1 in the case where the allowable range of temperatures for the coolant is narrow and the setting range of coolant temperatures is narrow as in the case of high-accuracy processing (finish processing).

In the case of FIG. 2, the controlling unit 12 monitors a heat balance Pc-Ps of the heat pump 10 to determine whether the heat balance Pc-Ps is a predetermined lower limit $-\Delta P$ or smaller, a predetermined upper limit $\Delta P$ or larger, or between the lower limit $-\Delta P$ and the upper limit $\Delta P$ (step S11). The lower limit $-\Delta P$ and the upper limit $\Delta P$ are set on the basis of an allowable value K of the amount of heat of the refrigerant with which the heat pump 10 can be continuously operated. If the heat balance Pc-Ps is between the lower limit $-\Delta P$ and the upper limit $\Delta P$, it is assumed that the absolute value of $\Delta P$ is smaller than the allowable value K. At that time, Pc-Ps is within the amount of heat with which the heat pump 10 can be continuously operated. It should be noted that the controlling unit 12 controls the temperature of the washing fluid to be fixed at a predetermined temperature for the heat pump 10.

In the case where the heat balance Pc-Ps is between the lower limit $-\Delta P$ and the upper limit $\Delta P$, the controlling unit 12 continues the operation as it is.

On the other hand, in the case where the heat balance Pc-Ps is the lower limit $-\Delta P$ or smaller, the controlling unit 12 determines that the amount of heat for heating is larger than the amount of heat for cooling, and determines whether or not the coolant temperature Tc obtained from the coolant temperature sensor is higher than a lower limit Tcmi of the coolant setting temperature (S12). In the case of Yes in S12, the controlling unit 12 controls to lower the coolant temperature Tc (S13, for example, from 20° C. to 19° C.), and adjusts the heat balance Pc-Ps. In the case of No, the controlling unit 12 allows the heat pump 10 to perform a heating operation (cold air radiation) (S14).

On the other hand, in the case where the heat balance Pc-Ps is the upper limit $\Delta P$ or larger, the controlling unit 12 determines that the amount of heat for heating is smaller than the amount of heat for cooling, and determines whether or not the coolant temperature Tc is lower than an upper limit Tcma of the coolant setting temperature (S15). In the case of Yes in S15, the controlling unit 12 controls to raise the coolant temperature Tc (S16, for example, from 20° C. to 21° C.), and adjusts the heat balance Pc-Ps. In the case of No, the controlling unit 12 allows the heat pump 10 to perform a cooling operation (warm air radiation) (S17).

As described above, in the case where temperatures are high and a large amount of heat for heating is not required in the summer season and the like when the amount of heat for heating is smaller than the amount of heat for cooling (and further, the difference between the amount of heat for heating and the amount of heat for cooling becomes larger than the allowable value K of the amount of heat of the refrigerant with which the heat pump can be continuously operated), the controlling unit 12 raises the coolant temperature Tc (S16), and thus the amount of heat for cooling by the heat pump 10 is reduced. Accordingly, the small amount of heat for cooling and the amount of heat for heating are well-balanced, and the energy for the heat pump 10 and the entire production line system 1 is further reduced. Further, since the coolant temperature Tc rises within the upper limit Tcma (S15), the cooling performance of the coolant is secured while reducing the energy.

In the case of FIG. 3, the controlling unit 12 branches the process in accordance with the heat balance Pc-Ps, as similar to S11 (S21). In the case where the heat balance Pc-Ps is between the lower limit $-\Delta P$ and the upper limit $\Delta P$, the controlling unit 12 determines that the heat balance Pc-Ps is within the amount of heat with which the heat pump 10 can be continuously and efficiently operated (the level of efficiency is a predetermined value or higher), and continues the operation as it is. It should be noted that the controlling unit 12 controls the temperature of the coolant to be fixed at a predetermined temperature for the heat pump 10.

On the other hand, in the case where the heat balance Pc-Ps is the lower limit $-\Delta P$ or smaller, the controlling unit 12 determines that the amount of heat for cooling is smaller than the amount of heat for heating, and determines whether or not the washing fluid temperature Ts obtained from the washing fluid temperature sensor is higher than a lower limit Tsmi of the washing fluid setting temperature (S22). In the case of Yes in S22, the controlling unit 12 controls to lower the washing fluid temperature Ts (S23, for example, from 60° C. to 59° C.), and adjusts the heat balance Pc-Ps. In the case of No, the controlling unit 12 allows the heat pump 10 to perform a heating operation (cold air radiation) (S24).

As described above, in the case where temperatures are low and a large amount of heat for cooling is not required in the winter season and the like when the amount of heat for cooling is smaller than the amount of heat for heating (and further, the difference between the amount of heat for heating and the amount of heat for cooling becomes larger than the allowable value K of the amount of heat of the refrigerant with which the heat pump can be continuously operated), the controlling unit 12 lowers the washing fluid temperature Ts (S23), and thus the amount of heat for heating of the heat pump 10 is reduced. Accordingly, the small amount of heat for heating and the amount of heat for cooling are well-balanced, and the energy for the heat pump 10 or the entire production line system 1 is further reduced. Further, since the washing fluid temperature Ts is lowered within the upper limit Tsmi (S22), the washing performance of the washing fluid is secured while reducing the energy.

On the other hand, in the case where the heat balance Pc-Ps is the upper limit ΔP or larger, the controlling unit 12 determines that the amount of heat for cooling is larger than the amount of heat for heating and determines whether or not the washing fluid temperature Ts is lower than the upper limit Tsma of the washing fluid setting temperature (S25). In the case of Yes in S25, the controlling unit 12 controls to raise the washing fluid temperature Ts (S26, for example, from 60° C. to 61° C.), and adjusts the heat balance Pc-Ps. In the case of No, the controlling unit 12 allows the heat pump 10 to perform a cooling operation (warm air radiation) (S27).

<Effects>

The above-described production line system 1 has the cooling processing step in which the coolant for the processing machines (lathes M) of work is cooled, and the heating processing step in which the washing fluid of the washing machine R that washes the work before or after processing by the lathes M is heated. The heating processing step and the cooling processing step are performed by the heat pump 10 in one heat pump cycle. Accordingly, the heat taken from the counterpart for heating and cooling can be used as a heating source, and the energy efficiency can be extremely enhanced. Further, the heating processing step of the washing fluid is performed right after or before the cooling processing step in the processing machines, and thus the cooling processing step and the heating processing step can be sequentially performed. Accordingly, a distance between the heat pump 10 and the cooling processing step or the heating processing step is shortened, resulting in low cost due to shortening of the pipe and energy saving due to reduction of a transmission loss. Further, it is possible to provide the heating/cooling system in which all processes can be completed in each set of processing lines of a plant, and thus flexibility can be extremely improved. In addition, since the heat pump is used in a set of processing lines, cooling and heating are always required at the same time during production. Accordingly, a cooling/heating simultaneous operation can be performed for a long time, and the production line with high energy efficiency can be realized.

Further, the heat balance between heating in the heating processing step and cooling in the cooling processing step is adjusted with the setting temperature of the washing fluid (see FIG. 3). Accordingly, the cooling/heating simultaneous operation can be continuously performed for a long time due to the matters shown below, and the energy can be considerably saved. Specifically, in the case of a processing machine that is required to process with high accuracy, it is necessary to extremely narrow the control range of the coolant temperatures in order to reduce impacts resulting from thermal expansion of the work and various devices caused by temperature changes (for example, ±1° C.). Further, the amount of heat necessary for cooling the coolant largely differs depending on temperature changes in every season. On the other hand, the washing fluid is required to be heated to a predetermined temperature or higher in order to exhibit the washing performance and the excellent drying performance after washing. However, any temperature (even a relatively-high temperature) higher than the predetermined temperature is permitted, and the range of the setting temperatures is wider than that of the coolant at the time of high-accuracy cutting. Accordingly, the temperature of the washing fluid can be set in line with the amount of heat necessary for cooling the coolant according to changes in ambient temperatures in each season. Specifically, the temperature of the washing fluid can be set low in the winter season and the like, and the temperature of the washing fluid can be set high in the summer season and the like. Thus, secondary heating and secondary cooling are not needed by securing the heat balance.

Further, the heat balance between heating in the heating processing step and cooling in the cooling processing step is adjusted with the setting temperature of the coolant (see FIG. 2). In the case where the setting range of the coolant temperatures can be freely changed in processes by a processing machine such as a rough cutting machine that is not required to process with high accuracy, the heat balance can be maintained by adjusting temperature setting of the coolant in accordance with the amount of heat necessary for heating the washing fluid. Thus, secondary heating and secondary cooling are not necessary, the cooling/heating simultaneous operation can be continuously performed for a long time, and the energy can be considerably saved.

Modified Examples

Another embodiment of the present invention which is achieved by mainly modifying the first embodiment will be exemplified. The heat balance is adjusted by changing the setting temperature in one of the heating processing step and the cooling processing step in accordance with the ambient temperature. The ambient temperature in the heating processing step includes the temperature of the washing machine (the air temperature around the washing machine), and a washing machine temperature sensor for measuring the temperature of the washing machine coupled to the controlling unit is provided at the washing machine. If the temperature of the washing machine is a predetermined temperature or higher, the process is moved to S15 or S25. Alternatively, the ambient temperature in the cooling processing step includes the temperature of each processing machine (the air temperature around each processing machine), and a processing machine temperature sensor for measuring the temperature of each processing machine coupled to the controlling unit is provided at each processing machine. If the temperature of each processing machine is a predetermined temperature or lower, S12 or S22 is performed. In this case, the heat balance can be stabilized by changing temperature setting of one processing step in accordance with the ambient temperature. Accordingly, the cooling/heating simultaneous operation can be continuously preformed for a long time, and the energy efficiency can be further improved.

Further, a coolant refrigerant for cooling the coolant may be allowed to flow in the cooling-side pipe to cool the coolant refrigerant with the heat pump. In this case, it is not necessary to introduce the coolant which possibly contains processing debris into the heat pump. Accordingly, the possibility of failures of the heat pump can be reduced and the pipes and the like can be easily installed. As similar to the above, a washing fluid refrigerant for heating the washing fluid may be allowed to flow in the heating-side pipe to heat the washing fluid refrigerant with the heat pump.

In addition, a coolant temperature controlling unit for controlling the temperature of the coolant is arranged at each processing machine. Each of the coolant temperature controlling units obtains the amount of heat generation of the processing machine from the sensor, and adjusts the temperature of the coolant by further cooling or heating the (cooled) coolant or the coolant refrigerant received from the heat pump on the basis of the amount of heat generation (the required amount of heat for cooling calculated from the amount of heat generation). Thus, the temperature of the coolant supplied to each processing machine can be independently controlled, and the temperature of each processing machine is stabilized. As a result, it is possible to provide a production line system with excellent energy efficiency and high processing accuracy. It should be noted that the amount of heat generation or the required amount of heat for cooling of each processing machine may be calculated from the return temperature of the coolant or the coolant refrigerant. In this case, a sensor for detecting the return temperature is arranged.

Alternatively, the number of processing machines in a processing line, the number of lines, the number of processing machines in each line, the number of work input machines, the number of delivery machines, the number of washing machines, and the details and arrangement of these may be variously changed instead of the above-described embodiment in such a manner that the washing machine is arranged on the upstream side relative to the processing machines in a line to perform washing before processing, processing machines other than the lathes are employed, or plural kinds of processing machines are mixed. The absolute values of the lower limit and the upper limit of the heat balance may be different from each other. The controlling unit may be provided at each processing machine (shared with the controlling unit of the processing machine), or plural controlling units may dispersed to cooperatively perform processing using communications.

Second Embodiment

<Configurations>

Figure 4A:
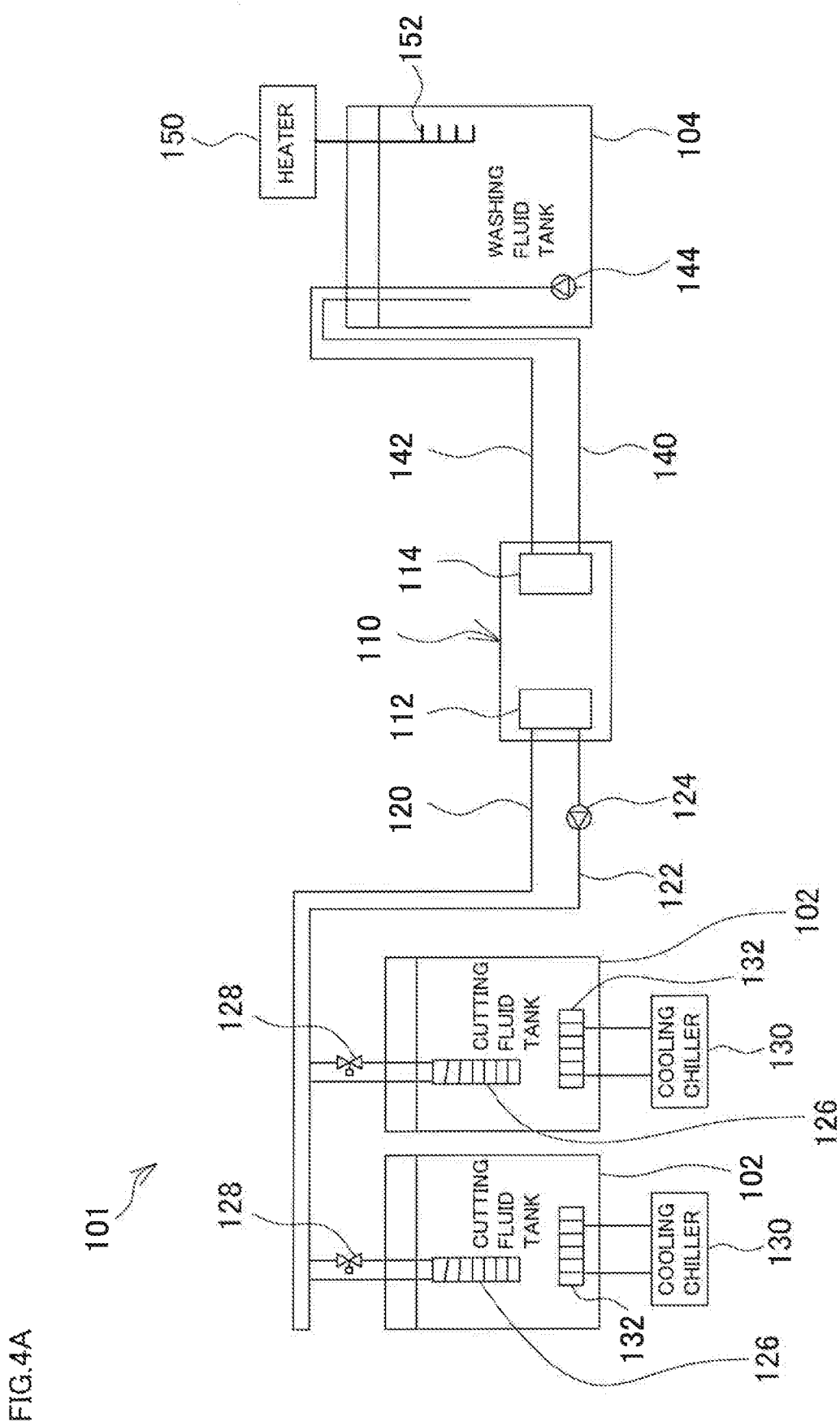
FIG. 4A is a diagram explaining a production line system according to a second embodiment of the present invention.

FIG. 4A is an explanation diagram of a production line system 101 of a second embodiment according to the present invention. The production line system 101 includes plural cutting fluid tanks 102 which store the cutting fluid, a washing fluid tank 104 which stores the washing fluid, and a heat pump 110 which cools the cutting fluid and heats the washing fluid, all of which are arranged to cool the cutting fluid in a cutting step in the production of machined parts and to heat the washing fluid in a washing step following the cutting step. The heat pump 110 includes an evaporator 112 which cools cold water by heat exchange, and a condenser 114 which heats the washing fluid by heat exchange. The evaporator 112 and the condenser 114 are incorporated into a heat pump cycle.

A cold water return pipe 120 for accepting the cold water and a cold water supply pipe 122 for discharging the cold water are coupled to the evaporator 112, and a cold water pump 124 for feeding the cold water is attached to the cold water supply pipe 122. Further, an input-type heat exchanger 126 arranged at each cutting fluid tank 102 is coupled to the cold-water supply pipe 122, and proportional valves 128 are arranged at the supply pipes 122 branched into the respective heat exchangers 126. The heat exchangers 126 cool the cutting fluid by heat exchange by allowing the cold water which is input to the cutting fluid tanks 102 and is cooled by the evaporator 112 to flow in the heat exchangers 126.

Further, a cooling chiller 130 as an additional cooling source is arranged at each cutting fluid tank 102, and each cooling chiller 130 is coupled to a chiller heat exchanger 132 arranged in each cutting fluid tank 102. Each of the cooling chillers 130 cools the refrigerant returned from the chiller heat exchanger 132, feeds the cooled refrigerant to the chiller heat exchanger 132, and cools the cutting fluid by heat exchange with the refrigerant through the chiller heat exchanger 132. It should be noted that the cooling chillers 130 and the chiller heat exchangers 132 may be omitted as shown in FIG. 4B.

On the other hand, a washing fluid return pipe 140 for accepting the washing fluid and a washing fluid supply pipe 142 for discharging the washing fluid are coupled to the condenser 114, and a washing fluid pump 144 for feeding the washing fluid is attached to the washing fluid supply pipe 142. The condenser 114 heats the washing fluid introduced from the washing fluid return pipe 140 by heat exchange to be discharged to the washing fluid supply pipe 142, and heats the washing fluid from the washing fluid tank 104 to be supplied to the washing fluid tank 104.

Further, a heater heat exchanger 152 as an additional heating source into which a medium heated by a heater 150 (an electric heater, a steam coil, or the like) flows is arranged at the washing fluid tank 104. The heater 150 heats the medium returned from the heater heat exchanger 152, feeds the heated medium to the heater heat exchanger 152, and heats the washing fluid by heat exchange with the medium through the heater heat exchanger 152. It should be noted that the heater 150 and the heater heat exchanger 152 may be omitted as shown in FIG. 4B.

On the other hand, the heat pump 110, the cooling chillers 130, and the heater 150 are coupled to a controlling unit (not shown). Further, a cold water temperature sensor (not shown) which obtains the temperature of the cold water in the cold water return pipe 120 and transmits information of the temperature, and a washing fluid temperature sensor (not shown) which obtains the temperature of the washing fluid in the washing fluid return pipe 140 and transmits information of the temperature are coupled to the controlling unit. Further, the proportional valves 128 are coupled to the controlling unit so that opening degrees can be adjusted on the basis of an opening degree command issued by the controlling unit. In addition, cutting fluid tank temperature sensors (not shown), each obtaining the temperature of the cutting fluid in the cutting fluid tank 102 and transmitting information of the temperature are coupled to the controlling unit.

Figure 5:
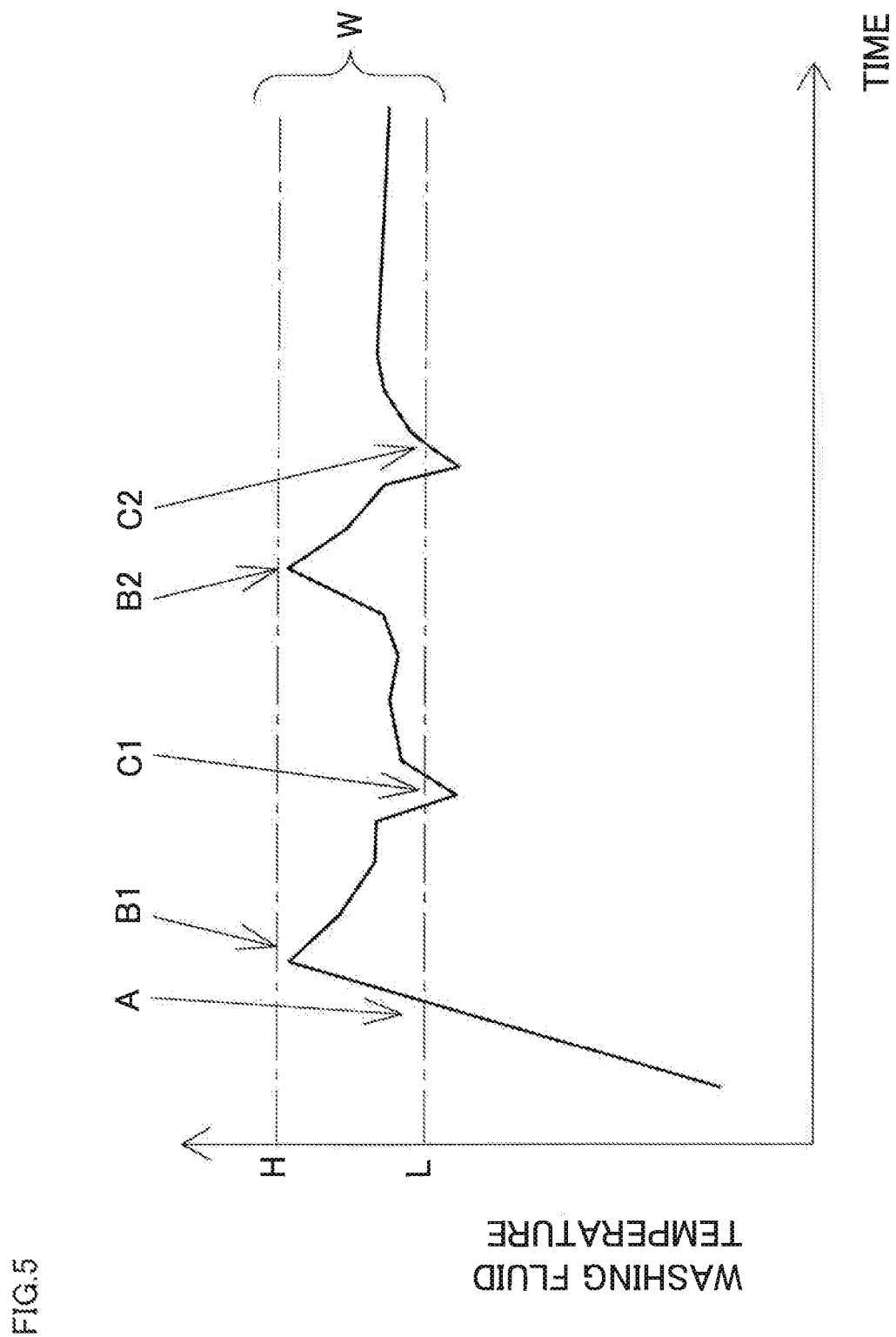
FIG. 5 is a graph for showing a heating operation state of the production line system of FIG. 4.

FIG. 5 is a graph for showing a transition example of the temperatures of the washing fluid in the washing fluid tank 104 with passage of time. The controlling unit allows the heat pump 110 to perform a heating operation in a state where a temperature width W is added to operation conditions. Specifically, a lower limit L (for example, 50° C.) and an upper limit H (for example, 60° C.) of the temperature of the washing fluid are set as heating operation conditions. If the temperature of the washing fluid becomes higher than the upper limit H, the controlling unit reduces the amount of heat for heating to be smaller than the previous amount of heat for heating. If the temperature of the washing fluid becomes lower than the lower limit L, the controlling unit increases the amount of heat for heating to be larger than the previous amount of heat for heating. The temperature width W (the difference between the upper limit H and the lower limit L) is preferably 2 to 10° C.

Further, the controlling unit allows the heat pump 110 to perform a cooling operation in a state where the temperature width W is added to operation conditions. Specifically, a cooling lower limit (for example, 15° C.) and a cooling upper limit (for example, 25° C.) of the temperature of the cold water are set as cooling operation conditions. If the temperature of the cold water becomes lower than the cooling lower limit, the controlling unit reduces the amount of heat for cooling to be smaller than the previous amount of heat for cooling. If the temperature of the cold water becomes higher than the cooling upper limit, the controlling unit increases the amount of heat for cooling to be larger than the previous amount of heat for cooling. The controlling unit allows the heat pump 110 to perform a cooling operation with the temperature width in a rough cutting step during a cutting step. Whether or not the rough cutting step is being performed is recognized by at least one of the states in which a button is pressed or not pressed, a switch is turned on or off, and work is input or not input to a rough cutting machine (detection by a work sensor). It should be noted that the temperature width (the difference between the cooling upper limit and the cooling lower limit) is preferably 2 to 10° C.

<Operations>

When the cold water pump 124 is started by the controlling unit, the cold water is introduced through the cold water return pipe 120. At the same time, when the washing fluid pump 144 is started, the washing fluid is introduced through the washing fluid return pipe 140, and then the heat pump 110 is started.

The heat pump 110 allows the evaporator 112 to cool the introduced cold water on the basis of a command from the controlling unit, and supplies the cooled cold water to the heat exchangers 126 through the cold water supply pipe 122. At the same time, the heat pump 110 allows the condenser 114 to heat the introduced washing fluid, and supplies the heated washing fluid to the washing fluid tank 104 through the washing fluid supply pipe 142.

Here, the washing fluid is required to be heated to a predetermined temperature lower limit (FIG. 5 and the like) in order to exhibit the washing performance. However, there are not many constraints in the upper limit. Accordingly, even if the temperature of the washing fluid obtained from the washing fluid temperature sensor becomes higher than the lower limit L which is set in accordance with the temperature lower limit, the controlling unit continues heating of the washing fluid without changing the heating operation state of the heat pump 110. When the controlling unit recognizes that the temperature of the washing fluid becomes higher than the upper limit H from the washing fluid temperature sensor, the controlling unit reduces the amount of heat for heating by the heat pump 110, and permits the temperature of the washing fluid to decline (arrows B1 and B2). It should be noted that the portion immediately before the arrow B2 represents temperature rise in break time.

On the other hand, when the temperature of the washing fluid becomes lower than the lower limit L, the controlling unit increases the amount of heat for heating by the heat pump 110, and raises the temperature of the washing fluid (arrows C1 and C2). Here, the controlling unit appropriately operates the heater 150 to assist heating performed by the heat pump 110. At this time, the controlling unit allows the heater 150 to be operated with the minimum amount of heat generation with which the temperature of the washing fluid can be raised higher than the lower limit L, and utilizes heating by the heat pump 110 as much as possible. It should be noted that the decline of the temperature of the washing fluid occurs in the case where the number of parts to be washed (washing amount) is drastically increased, or makeup water for washing water is input.

On the other hand, the cutting fluid is required to be cooled to a predetermined temperature upper limit or lower, but there are not many constraints in the lower limit because high accuracy is not strictly required in the rough cutting step as compared to the precision cutting step (finish processing) and high accuracy is not strictly required for the temperature of the cutting fluid. Accordingly, in the case where the controlling unit recognizes that the rough cutting step is being performed, if the temperature of the cold water (corresponding to the temperature of the cutting fluid) obtained from the cold water temperature sensor becomes lower than the upper limit which is set in accordance with the temperature upper limit, the controlling unit continues cooling of the cutting fluid without changing the cooling operation state of the heat pump 110. Then, when the controlling unit recognizes that the temperature of the cold water becomes lower than the lower limit from the cold water temperature sensor, the controlling unit reduces the amount of heat for cooling by the heat pump 110, and permits the temperature of the cutting fluid to rise.

Further, because temperatures are strictly controlled in the precision cutting step (for example, within ±1° C. of a specific temperature (bed temperature of the lathe)), in the case where the controlling unit does not recognizes that the rough cutting step is being performed, the controlling unit does not control in the same manner as in the rough cutting step, but cools the cold water so that the temperature of the cutting fluid falls within the required range. It should be noted that the controlling unit appropriately operates the cooling chillers 130 to assist cooling of the cutting fluid performed by the heat pump 110. At this time, the controlling unit allows the cooling chillers 130 to be operated with the minimum amount of heat for cooling with which the temperature of the cold water (the temperature of the cutting fluid) can be turned down lower than the upper limit, and utilizes cooling by the heat pump 110 as much as possible.

It should be noted that in accordance with the temperature of the cutting fluid in each of the cutting fluid tanks 102 obtained from the cutting fluid tank temperature sensor or the temperature of the cold water which is additionally obtained, the controlling unit adjusts the opening degree of each corresponding proportional valve 128.

<Effects>

The above-described production line system 101 includes the heat pump 110 which cools the cutting fluid and heats the washing fluid. If the temperature of the washing fluid becomes higher than the predetermined upper limit H, the heat pump 110 reduces the amount of heat for heating. If the temperature of the washing fluid becomes lower than the predetermined lower limit L, the heat pump 110 increases the amount of heat for heating. Accordingly, as compared to a conventional case in which the temperature of the cutting fluid and the temperature of the washing fluid are kept at the specific temperatures by heat pumps, the common heat pump 110 can efficiently perform cooling and heating operations, and the number of times of switching the heating operation state can be reduced in consideration of efficiency. Thus, the cutting fluid can be cooled and the washing fluid can be heated with less energy.

Further, in the case where the cutting fluid is cooled in the rough cutting step, the heat pump 110 reduces the amount of heat for cooling if the temperature of the cutting fluid becomes lower than the predetermined cooling lower limit. In addition, the heat pump 101 increases the amount of heat for cooling if the temperature of the cutting fluid becomes higher than the predetermined cooling upper limit. Accordingly, the cooling operation can be efficiently performed while reducing the number of times of switching the operation state. In addition, the cutting fluid can be cooled and the washing fluid can be heated with less energy.

Further, because the difference (temperature width W) between the upper limit H and the lower limit L is 2° C. to 10° C. in heating of the washing fluid, the efficient operation of the heat pump 110 can be moderately continued or the operation is not frequently switched while satisfying the desired conditions as the temperature of the washing fluid. Thus, the heating performance and efficiency are well-balanced, and the excellent heating performance and high efficiency can be realized at the same time. As similar to the above, because the difference between the cooling upper limit and the cooling lower limit is 2° C. to 10° C., the excellent cooling performance and high efficiency can be realized at the same time while satisfying the desired conditions as the temperature of the cutting fluid in the rough cutting step.

In addition, the heater 150 is additionally provided to heat the washing fluid. Accordingly, it is possible to avoid making longer a period in which the washing performance is deteriorated because the temperature of the washing fluid becomes lower than the lower limit L. Further, it is possible to improve reliability while securing a backup when the temperature of the washing fluid is steeply declined or the heat pump 110 is not properly operated. Further, the additional cooling source for cooling the cutting fluid is provided. Accordingly, it is possible to avoid making longer a period in which the cutting accuracy is disadvantageously affected because the temperature of the cutting fluid becomes higher than the cooling upper limit. Further, it is possible to improve reliability while securing a backup when the temperature of the cutting fluid is steeply raised and the heat pump 110 is not properly operated.

It should be noted that the cutting fluid tank temperature sensor which obtains the temperature of the cutting fluid is provided at each cutting fluid tank 102, the opening degree of the corresponding proportional valve 128 is adjusted in accordance with the temperature of the cutting fluid (or the temperature of the cold water) in the cutting fluid tank 102. Accordingly, the cutting fluid can be appropriately cooled in accordance with the load on each cutting fluid tank 102.

Third Embodiment

<Configurations>

Figure 6A:
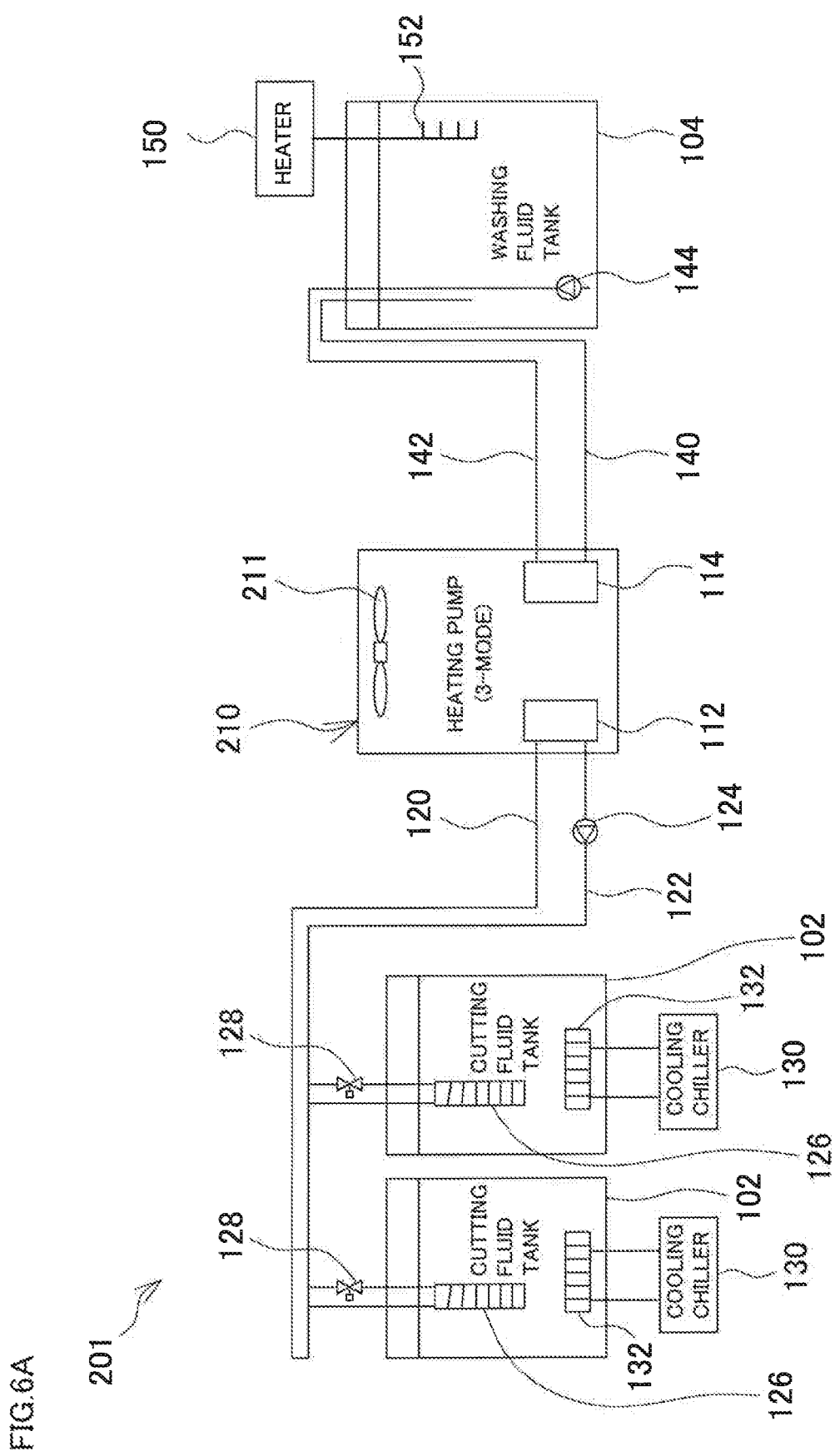
FIG. 6A is a diagram explaining a production line system according to a third embodiment of the present invention.

A production line system 201 according to a third embodiment shown in FIG. 6A is configured in the same manner as the second embodiment except that the heat pump is a 3-mode heat pump 210. The 3-mode heat pump 210 includes a fan 211, and a cooling single operation function and a heating single operation function are provided, in addition to the cooling/heating simultaneous operation function. It should be noted that the cooling chillers 130, the chiller heat exchangers 132, and/or the heater 150, and the heater heat exchanger 152 may be omitted as shown in FIG. 6B.

<Operations>

In the case where the cooling load when cooling the cold water in the cutting fluid tank 102 and the heating load when heating the washing fluid in the washing fluid tank 104 are placed at the same time, the controlling unit allows the 3-mode heat pump 210 to perform the cooling/heating simultaneous operation. Further, in the case where the heating operation is not necessary because the cooling load is placed but the heating load is not placed, the controlling unit allows the 3-mode heat pump 210 to perform the cooling single operation. Further, in the case where the cooling operation is not necessary because the heating load is placed but the cooling load is not placed, the controlling unit allows the 3-mode heat pump 210 to perform the heating single operation. The 3-mode heat pump 210 performs the heating operation with the temperature width in the cooling/heating simultaneous operation or the heating single operation as similar to the second embodiment. Further, the 3-mode heat pump 210 performs the cooling operation with the temperature width in the cooling/heating simultaneous operation or the cooling single operation during the rough cutting step, and performs the heating operation with the temperature width in the cooling/heating simultaneous operation or the heating single operation as similar to the second embodiment.

<Effects>

In the production line system 201, the 3-mode heat pump 210 is used as a heat pump to enable the cooling/heating simultaneous operation, the cooling single operation, or the heating single operation. Accordingly, no matter how the cooling load or the heating load appears or changes, the 3-mode heat pump 210 flexibly and appropriately process while switching the operation state.

Further, if the temperature of the washing fluid becomes higher than the predetermined upper limit, the 3-mode heat pump 210 reduces the amount of heat for heating. If the temperature of the washing fluid becomes lower than the predetermined lower limit, the 3-mode heat pump 210 increases the amount of heat for heating. Alternatively, the 3-mode heat pump 210 performs processing in the same manner when cooling the cutting fluid during the rough cutting step. Accordingly, the operation efficiency can be highly improved. In addition, the heater 150 and the cooling chillers 130 are arranged in the production line system 201. Thus, the performance of each fluid can be maintained and a backup can be secured.

<Inventions>

Here, main aspects according to the second embodiment and the third embodiment will be described.

(1) A production line system including a heat pump which cools a cutting fluid and heats a washing fluid, wherein if the temperature of the washing fluid becomes higher than a predetermined upper limit, the heat pump reduces the amount of heat for heating or stops heating, or if the temperature of the washing fluid becomes lower than a predetermined lower limit, the heat pump increases the amount of heat for heating or resumes heating.

An object of the present invention is to provide a production line system (cooling/heating system) in which the initial cost and running cost can be reduced and the improved energy saving can be realized by efficiently operating the heat pump.

(2) The production line system according to the aspect (1), wherein in the case of cooling the cutting fluid in a rough cutting step, if the temperature of the cutting fluid becomes lower than a predetermined cooling lower limit, the heat pump reduces the amount of heat for cooling or stops cooling, or if the temperature of the cutting fluid becomes higher than a predetermined cooling upper limit, the heat pump increases the amount of heat for cooling or resumes cooling.

In addition to the above-described object, the present invention provides a production line system in which the heat pump can be more efficiently operated and the energy saving of the apparatus can be realized.

(3) The production line system according to the aspect (1) or (2), wherein the difference between the upper limit and the lower limit is 2° C. to 10° C., and/or the difference between the cooling upper limit and the cooling lower limit is 2° C. to 10° C.

In addition to the above-described objects, the present invention realizes the excellent cooling/heating performance and high efficiency at the same time.

(4) The production line system according to any one of the aspects (1) to (3), wherein the heat pump is a 3-mode heat pump which enables a cooling/heating simultaneous operation, a cooling single operation, or a heating single operation.

In addition to the above-described objects, the present invention appropriately performs processing even if the cooling load and the heating load are different in size and timing of appearance.

(5) The production line system according to any one of the aspects (1) to (4), wherein there are/is provided an additional heating source for heating the washing fluid, and/or an additional cooling source for cooling the cutting fluid.

In addition to the above-described objects, the present invention avoids making longer a period in which the temperature of the washing fluid becomes lower than the lower limit and a period in which the temperature of the cutting fluid becomes higher than the upper limit, and improves reliability while securing a backup.

Modified Examples

Still another embodiment of the present invention achieved by mainly modifying the second embodiment or the third embodiment will be exemplified. The controlling units are provided at the heat pump, the heater, the cooling chillers, and the like (shared with the controlling unit of the heat pump), or plural controlling units are dispersed to cooperatively perform processing using communications. The temperature of the washing fluid is obtained from that in the washing fluid tank or in the washing fluid supply pipe, and the setting position of the washing fluid temperature sensor is accordingly changed, or the temperature of the cold water (the temperature of the cutting fluid) is similarly changed. If the temperature of the washing fluid becomes higher than the upper limit, the heat pump stops heating. If the temperature of the washing fluid becomes lower than the lower limit, the heat pump resumes heating. The temperature of the cutting fluid in the rough cutting step is similarly changed. The cutting fluid is directly introduced to the heat pump and returned after cooling without providing the input-type heat exchangers. A warm water circuit and a heat exchanger are provided, and the washing fluid is heated through the heat exchanger to which heated warm water is fed. Instead of the proportional valves, on/off valves are installed. The cooling chillers are operated to assist cooling in the rough cutting step.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

What is claimed is:

1. A production line system comprising:
   one heat pump;
   at least one processing machine for processing work, fluidly connected to the heat pump;
   a washing machine fluidly connected to the heat pump; and
   a control unit electrically coupled to the heat pump, wherein the control unit is configured to control the heat pump to perform a plurality of processing steps including:
   a cooling processing step of cooling a coolant for the at least one processing machine, and
   a heating processing step of heating a washing fluid of the washing machine before or after processing by the at least one processing machine, wherein
   the heating processing step and the cooling processing step are performed in a heat pump cycle by the heat pump, the heat pump further comprising only an evaporator and a condenser, wherein the at least one processing machine and the washing machine are each fluidly connected by a refrigerant to the heat pump, whereby the coolant is cooled by heat exchange with the refrigerant in the evaporator during the cooling processing step and the washing fluid is heated by heat exchange with the refrigerant in the condenser during the heat processing step in one heat pump cycle.

2. The production line system according to claim 1, wherein
   in any one of the heating processing step and the cooling processing step, the setting temperature is changed in accordance with the ambient temperature by the control unit, so that a heat balance between heating in the heating processing step and cooling in the cooling processing step is adjusted.

3. The production line system according to claim 1, wherein
   the cooling processing step is performed in which a coolant refrigerant is cooled by heat exchange with a refrigerant of the heat pump via the evaporator of the heat pump, and the coolant is cooled by the cooled coolant refrigerant.

4. The production line system according to claim 3, wherein the coolant is stored in a cutting fluid tank in which a heat exchanger is disposed for heat exchange between the coolant refrigerant and the coolant.

5. The production line system according to claim 1, wherein
   a coolant temperature controlling unit is arranged at each processing machine so as to independently control a temperature of the coolant, such that the cooled coolant received from the heat pump at each respective processing machine is further cooled or heated.

6. The production line system according to claim 1, wherein
   the heat balance between heating in the heating processing step and cooling in the cooling processing step is adjusted with the setting temperature of the washing fluid by the control unit.

7. The production line system according to claim 1 wherein
   the heat balance between heating in the heating processing step and cooling in the cooling processing step is adjusted with the setting temperature of the coolant by the control unit.

8. The production line system according to claim 1, wherein
   the heating processing step includes heating of the washing fluid by heat exchange with a refrigerant of the heat pump via the condenser of the heat pump.

9. The production line system according to claim 8, wherein
   the washing fluid is stored in a washing fluid tank, and a washing fluid return pipe for accepting the washing fluid and a washing fluid supply pipe for discharging the washing fluid are coupled to the condenser, wherein
   the condenser heats the washing fluid introduced from the washing fluid return pipe by heat exchange and supplies the heated washing fluid to the washing fluid tank.

10. The production line system according to claim 9, wherein
a heater heat exchanger is arranged in the washing fluid tank so as to heat the washing fluid in the washing fluid tank.

* * * * *